United States Patent
Hong et al.

(10) Patent No.: US 11,742,901 B2
(45) Date of Patent: Aug. 29, 2023

(54) DEEP LEARNING BASED BEAMFORMING METHOD AND APPARATUS

(71) Applicants: ELECTRONICS AND TELECOMMUNICATIONS RESEARCH INSTITUTE, Daejeon (KR); Pukyong National University Industry-University Cooperation Foundation, Busan (KR)

(72) Inventors: Seung Eun Hong, Daejeon (KR); Hoon Lee, Busan (KR); Seok Hwan Park, Jeonju-si (KR); Jun Beom Kim, Gwangju (KR)

(73) Assignees: ELECTRONICS AND TELECOMMUNICATIONS RESEARCH INSTITUTE, Daejeon (KR); PUKYONG NATIONAL UNIVERSITY INDUSTRY-UNIVERSITY COOPERATION FOUNDATION, Busan (KR)

(*) Notice: Subject to any disclaimer, the term of this patent is extended or adjusted under 35 U.S.C. 154(b) by 94 days.

(21) Appl. No.: 17/380,826

(22) Filed: Jul. 20, 2021

(65) Prior Publication Data
US 2022/0029665 A1    Jan. 27, 2022

(30) Foreign Application Priority Data

Jul. 27, 2020 (KR) .................. 10-2020-0092834
Jul. 12, 2021 (KR) .................. 10-2021-0091256

(51) Int. Cl.
*H04B 7/0426*    (2017.01)
*G06N 3/08*    (2023.01)
*H04B 7/08*    (2006.01)

(52) U.S. Cl.
CPC ............ *H04B 7/043* (2013.01); *G06N 3/08* (2013.01); *H04B 7/086* (2013.01)

(58) Field of Classification Search
None
See application file for complete search history.

(56) References Cited

U.S. PATENT DOCUMENTS 5,214,715 A * 5/1993 Carpenter ......... G06F 18/23211
 706/20
5,671,337 A * 9/1997 Yoshihara ................ G06N 3/08
 706/43

(Continued)

FOREIGN PATENT DOCUMENTS

CN    112925888 A  *  6/2021
CN    113193896 A  *  7/2021 ............... G06N 3/04

(Continued)

OTHER PUBLICATIONS

W. Xia, G. Zheng, Y. Zhu, J. Zhang, J. Wang and A. P. Petropulu, "A Deep Learning Framework for Optimization of MISO Downlink Beamforming," in IEEE Transactions on Communications, vol. 68, No. 3, pp. 1866-1880, Mar. 2020, doi: 10.1109/TCOMM.2019. 2960361. (Year: 2020).*

*Primary Examiner* — Berhanu Tadese
(74) *Attorney, Agent, or Firm* — LRK PATENT LAW FIRM

(57) ABSTRACT

Disclosed is a beamforming method using a deep neural network. The deep neural network may include an input layer, L hidden layers, and an output layer, and the beamforming method may include: obtaining channel information h between a base station and K terminals and a transmit power limit value P of the base station, and inputting h and P into the input layer; and performing beamforming on signals to be transmitted to the K terminals using beamforming vectors derived using the output layer and at least (Continued)

one activation function, wherein the base station transmits the signals to the K terminals using M transmit antennas. Here, the output layer may be configured in a direct beamforming learning (DBL) scheme, a feature learning (FL) scheme, or a simplified feature learning (SFL) scheme.

15 Claims, 11 Drawing Sheets

(56) References Cited

U.S. PATENT DOCUMENTS

| | | | | |
|---|---|---|---|---|
| 5,764,859 | A * | 6/1998 | Kim | G06N 3/08 706/31 |
| 5,943,660 | A * | 8/1999 | Yesildirek | G05B 13/027 706/15 |
| 6,311,172 | B1 * | 10/2001 | Tresp | G06N 3/08 706/20 |
| 6,882,992 | B1 * | 4/2005 | Werbos | G05B 13/027 706/48 |
| 7,089,217 | B2 * | 8/2006 | Kasabov | G06N 3/043 706/14 |
| 7,321,882 | B2 * | 1/2008 | Jaeger | G06N 3/08 706/30 |
| 8,103,606 | B2 * | 1/2012 | Moussa | G06N 3/063 706/31 |
| 8,468,109 | B2 * | 6/2013 | Moussa | G06N 3/084 706/31 |
| 8,943,008 | B2 * | 1/2015 | Ponulak | G06N 3/049 706/25 |
| 9,008,414 | B2 * | 4/2015 | Merkl | A61B 34/20 382/155 |
| 9,015,091 | B2 * | 4/2015 | Hunzinger | G06N 3/082 706/25 |
| 9,424,511 | B2 * | 8/2016 | Hunzinger | G06N 3/049 |
| 9,424,513 | B2 * | 8/2016 | Hunzinger | G06N 3/049 |
| 9,443,190 | B2 * | 9/2016 | Hunzinger | G06N 3/049 |
| 9,463,571 | B2 * | 10/2016 | Sinyavskiy | G06N 3/049 |
| 9,630,318 | B2 * | 4/2017 | Ibarz Gabardos | G05D 1/0246 |
| 9,646,243 | B1 * | 5/2017 | Gokmen | G06N 3/08 |
| 9,715,656 | B1 * | 7/2017 | Gokmen | G06N 3/08 |
| 10,019,470 | B2 * | 7/2018 | Birdwell | G06N 3/049 |
| 10,055,434 | B2 * | 8/2018 | Birdwell | G06N 3/049 |
| 10,095,718 | B2 * | 10/2018 | Birdwell | G06N 3/10 |
| 10,164,179 | B2 * | 12/2018 | Brew | H10N 70/245 |
| 10,171,084 | B2 * | 1/2019 | Lu | G06N 3/02 |
| 10,216,422 | B2 * | 2/2019 | Kim | G06F 3/0614 |
| 10,229,355 | B2 * | 3/2019 | Ronagh | G06N 3/08 |
| 10,248,675 | B2 * | 4/2019 | Birdwell | G06N 3/065 |
| 10,248,907 | B2 * | 4/2019 | Gokmen | G06N 3/047 |
| 10,282,622 | B2 * | 5/2019 | Togashi | G08B 13/19604 |
| 10,373,051 | B2 * | 8/2019 | Gokmen | G06N 3/084 |
| 10,398,387 | B2 * | 9/2019 | Merkl | A61B 34/10 |
| 10,498,341 | B2 * | 12/2019 | Lu | G06N 3/063 |
| 10,572,773 | B2 * | 2/2020 | Yehezkel Rohekar | G06F 18/2148 |
| 10,671,912 | B2 * | 6/2020 | Gottfried | G06N 3/049 |
| 10,706,285 | B2 * | 7/2020 | Deng | G06V 20/52 |
| 10,740,671 | B2 * | 8/2020 | Gokmen | G06N 3/04 |
| 10,762,424 | B2 * | 9/2020 | Nazari | G06F 17/18 |
| 10,782,939 | B2 * | 9/2020 | Gaunt | G06N 20/00 |
| 10,812,083 | B2 * | 10/2020 | Lu | G06F 9/30036 |
| 10,848,519 | B2 * | 11/2020 | Howard | G06N 3/045 |
| 10,860,890 | B2 * | 12/2020 | Haneda | G06V 10/82 |
| 10,938,464 | B1 * | 3/2021 | Jeong | H04B 7/063 |
| 10,948,467 | B2 * | 3/2021 | Gao | G01N 33/00 |
| 10,956,815 | B2 * | 3/2021 | Gokmen | G06N 3/08 |
| 10,976,405 | B2 * | 4/2021 | Isson | G01S 5/02524 |
| 11,017,293 | B2 * | 5/2021 | Vianello | G06N 3/065 |
| 11,027,395 | B2 * | 6/2021 | Suzuki | H01L 22/26 |
| 11,050,473 | B2 * | 6/2021 | Park | H04B 7/0617 |
| 11,070,301 | B2 * | 7/2021 | Su | G06N 3/088 |
| 11,119,250 | B2 * | 9/2021 | O'Donncha | G01W 1/00 |
| 11,161,241 | B2 * | 11/2021 | Sinyavskiy | G05D 1/0088 |
| 11,195,089 | B2 * | 12/2021 | Chan | H01L 31/035218 |
| 11,199,839 | B2 * | 12/2021 | Jiang | G06N 3/044 |
| 11,228,767 | B2 * | 1/2022 | Hannuksela | H04N 19/142 |
| 11,271,699 | B1 * | 3/2022 | Eyuboglu | H04B 7/0691 |
| 11,284,361 | B2 * | 3/2022 | Najla | H04W 52/52 |
| 11,321,608 | B2 * | 5/2022 | Yasuda | G11C 13/0069 |
| 11,354,542 | B2 * | 6/2022 | Yehezkel Rohekar | G06V 10/454 |
| 11,418,219 | B2 * | 8/2022 | Yoshizawa | H03M 13/451 |
| 11,430,523 | B2 * | 8/2022 | Hong | G06F 12/0246 |
| 11,480,971 | B2 * | 10/2022 | Isele | G05D 1/0088 |
| 11,481,598 | B2 * | 10/2022 | Khapali | G06N 3/04 |
| 2002/0059153 | A1 * | 5/2002 | Dan | G06N 3/008 706/62 |
| 2012/0185416 | A1 * | 7/2012 | Baras | G06N 3/02 706/12 |
| 2013/0085344 | A1 * | 4/2013 | Merkl | G16H 50/50 600/300 |
| 2015/0339589 | A1 * | 11/2015 | Fisher | G06V 10/454 706/12 |
| 2017/0095923 | A1 * | 4/2017 | Sinyavskiy | G06N 3/008 |
| 2017/0208613 | A1 * | 7/2017 | Nam | H04B 7/0634 |
| 2017/0291301 | A1 * | 10/2017 | Ibarz Gabardos | B25J 9/1607 |
| 2018/0150143 | A1 * | 5/2018 | Orr | G06N 3/084 |
| 2018/0177461 | A1 * | 6/2018 | Bell | A61B 5/7267 |
| 2019/0184561 | A1 * | 6/2019 | Yip | G06N 3/044 |
| 2019/0220750 | A1 * | 7/2019 | Fujiwara | G06N 5/048 |
| 2019/0228292 | A1 * | 7/2019 | Yasuda | G06N 3/065 |
| 2019/0244136 | A1 * | 8/2019 | Hu | G06V 40/70 |
| 2019/0281211 | A1 * | 9/2019 | Watola | H04N 23/951 |
| 2019/0291215 | A1 * | 9/2019 | Izumi | B23K 26/38 |
| 2019/0349037 | A1 * | 11/2019 | O'Shea | G06N 3/08 |
| 2019/0362231 | A1 * | 11/2019 | Li | G06N 3/084 |
| 2019/0380658 | A1 * | 12/2019 | Merkl | G16H 50/50 |
| 2020/0019871 | A1 * | 1/2020 | Balakrishnan | G06N 5/045 |
| 2020/0059306 | A1 * | 2/2020 | Baek | H04B 7/0473 |
| 2020/0153494 | A1 * | 5/2020 | Park | H04B 7/0617 |
| 2020/0175419 | A1 * | 6/2020 | Bird | H04L 67/5681 |
| 2020/0202723 | A1 * | 6/2020 | Pierre | G08G 5/0052 |
| 2020/0234179 | A1 * | 7/2020 | Lore | G06N 3/088 |
| 2020/0380354 | A1 * | 12/2020 | Zhao | G06N 3/044 |
| 2021/0001526 | A1 * | 1/2021 | Hirano | G06N 20/00 |
| 2021/0004720 | A1 * | 1/2021 | Henri | G06N 20/00 |
| 2021/0027178 | A1 * | 1/2021 | Ding | G06F 16/9535 |
| 2021/0065065 | A1 * | 3/2021 | Matei | G06N 7/01 |
| 2021/0067216 | A1 * | 3/2021 | Jeong | H04B 7/0617 |
| 2021/0103295 | A1 * | 4/2021 | Billault | G08G 5/0034 |
| 2021/0166577 | A1 * | 6/2021 | Hong | A61M 21/02 |
| 2021/0176780 | A1 * | 6/2021 | Kang | H04W 72/0453 |
| 2021/0176797 | A1 * | 6/2021 | Kang | H04W 74/008 |
| 2021/0216856 | A1 * | 7/2021 | Danneville | G06N 3/044 |
| 2021/0232144 | A1 * | 7/2021 | Lee | H04W 72/23 |
| 2021/0250068 | A1 * | 8/2021 | Lee | H04B 7/0456 |
| 2021/0282180 | A1 * | 9/2021 | Kang | H04W 72/21 |
| 2021/0383171 | A1 * | 12/2021 | Lee | G06N 3/045 |
| 2021/0398004 | A1 * | 12/2021 | Kim | G06N 7/01 |
| 2021/0399575 | A1 * | 12/2021 | Nagino | H02J 3/38 |
| 2022/0014398 | A1 * | 1/2022 | Andrews | H04B 1/40 |
| 2022/0029665 | A1 * | 1/2022 | Hong | G06N 3/088 |
| 2022/0091275 | A1 * | 3/2022 | Held | G06N 7/01 |
| 2022/0103267 | A1 * | 3/2022 | Jung | H04B 17/19 |
| 2022/0171373 | A1 * | 6/2022 | Chau | C23C 14/54 |
| 2022/0172054 | A1 * | 6/2022 | Karapantelakis | G06N 3/048 |
| 2022/0182175 | A1 * | 6/2022 | Kvernvik | H04L 1/0009 |
| 2022/0210082 | A1 * | 6/2022 | Wu | H04L 47/24 |
| 2022/0232608 | A1 * | 7/2022 | Kim | H04W 72/23 |
| 2022/0247605 | A1 * | 8/2022 | Rekaya | G06N 3/084 |
| 2022/0278769 | A1 * | 9/2022 | Vankayala | H04L 25/067 |
| 2022/0284352 | A1 * | 9/2022 | Chang | G06N 3/08 |
| 2022/0318621 | A1 * | 10/2022 | Gong | G06N 3/006 |
| 2022/0383194 | A1 * | 12/2022 | Idesawa | G06N 20/00 |

FOREIGN PATENT DOCUMENTS

| | | | | |
|---|---|---|---|---|
| CN | 113344187 | A * | 9/2021 | |
| CN | 113519104 | A * | 10/2021 | G05B 15/02 |
| CN | 113835421 | A * | 12/2021 | |
| EP | 3686812 | A1 * | 7/2020 | G06N 20/00 |

(56) References Cited

FOREIGN PATENT DOCUMENTS

| | | | | | |
|---|---|---|---|---|---|
| EP | 3869521 | A1 | * | 8/2021 | ............ A61B 34/10 |
| EP | 3871938 | A1 | * | 9/2021 | ............ B60W 40/00 |
| EP | 3913601 | A1 | * | 11/2021 | ............ H04B 17/19 |
| EP | 3927067 | A1 | * | 12/2021 | ............ H04W 4/70 |
| EP | 3937346 | A1 | * | 1/2022 | ............ G05B 15/02 |
| JP | 6767416 | B2 | * | 10/2020 | ............ B23K 26/00 |
| JP | 6865819 | B2 | * | 4/2021 | ............ G06N 3/049 |
| JP | 6903611 | B2 | * | 7/2021 | ............ G06N 3/0454 |
| JP | 6921961 | B2 | * | 8/2021 | ............... G06N 3/04 |
| KR | 10-2019-0069332 | A | | 6/2019 | |
| KR | 10-2020-0062653 | A | | 6/2020 | |
| KR | 10-2154481 | B1 | | 9/2020 | |
| WO | 2019/119442 | A1 | | 6/2019 | |
| WO | 2020/076324 | A1 | | 4/2020 | |
| WO | 2020/135919 | A1 | | 9/2020 | |
| WO | WO-2020205339 | A1 | * | 10/2020 | ............ C23C 14/54 |
| WO | WO-2020226257 | A1 | * | 11/2020 | ........... A61B 5/1103 |
| WO | WO-2020249961 | A1 | * | 12/2020 | ............ G06N 20/00 |
| WO | WO-2021100179 | A1 | * | 5/2021 | ............... G06N 3/08 |
| WO | WO-2021117373 | A1 | * | 6/2021 | ........... H04B 7/0617 |
| WO | WO-2021120199 | A1 | * | 6/2021 | |
| WO | WO-2021208122 | A1 | * | 10/2021 | ........... G06N 3/0454 |

\* cited by examiner

| Type 1 DL BF | | Type 2 DL BF | | Type 3 DL BF | | WMMSE | | |
|---|---|---|---|---|---|---|---|---|
| FNN | CNN | FNN | CNN | FNN | CNN | P = 0dB | P = 10dB | P = 20dB |
| 1.952e-4 | 1.161e-3 | 4.139e-4 | 1.393e-3 | 4.074e-4 | 1.385e-3 | 4.519e-3 | 9.767e-3 | 3.476e-2 |

(a) M=K=6

| Type 1 DL BF | | Type 2 DL BF | | Type 3 DL BF | | WMMSE | | |
|---|---|---|---|---|---|---|---|---|
| FNN | CNN | FNN | CNN | FNN | CNN | P = 0dB | P = 10dB | P = 20dB |
| 2.661e-4 | 2.601e-3 | 5.525e-4 | 2.816e-3 | 5.461e-4 | 2.806e-3 | 8.537e-3 | 1.991e-2 | 7.002e-2 |

DEEP LEARNING BASED BEAMFORMING METHOD AND APPARATUS

CROSS-REFERENCE TO RELATED APPLICATIONS

This application claims priority to Korean Patent Applications No. 10-2020-0092834 filed on Jul. 27, 2020, and No. 10-2021-0091256 filed on Jul. 12, 2021 with the Korean Intellectual Property Office (KIPO), the entire contents of which are hereby incorporated by reference.

BACKGROUND

1. Technical Field

The present disclosure relates to a method and an apparatus for beamforming in a base stating having a plurality of antennas, and more specifically, to a deep learning based beamforming method and an apparatus for the same, which provide an optimal performance by performing calculation of beamforming vectors in real time in a wireless system for simultaneously providing services to a plurality of terminals through beamforming.

2. Description of Related Art

In order to cope with the continuous increase in wireless traffic, a beamforming technology capable of simultaneously transmitting a plurality of data units in space using multiple antennas has been introduced. In addition, more users are served through dense deployment of base stations. In this case, interference between users also increases. Therefore, the performance of the wireless system can be increased only when the interference can be controlled. In order to properly control the interference, it is required to utilize full channel information between a plurality of transmitters/receivers. Therefore, in a system having a base station or a distributed MIMO system having a C-RAN type central control apparatus, the base station capable of utilizing channel information between users or the central control apparatus capable of utilizing channel information between distributed base stations/antennas and users may calculate beamforming vectors for controlling interference between the users based on the channel information, and simultaneously transmit data units to the users based on the beamforming vectors, thereby maximizing performance such as a sum data rate.

SUMMARY

Accordingly, exemplary embodiments of the present disclosure are directed to providing a beamforming method using a deep neural network.

Accordingly, exemplary embodiments of the present disclosure are further directed to providing a beamforming control apparatus using a deep neural network.

Accordingly, exemplary embodiments of the present disclosure are further directed to providing a cloud radio access network (C-RAN) system performing beamforming by using a deep neural network.

According to a first exemplary embodiment of the present disclosure, a deep neural network may comprise an input layer, L hidden layers (L is a natural number greater than or equal to 1), and an output layer, and a beamforming method using the deep neural network may comprise: obtaining channel information h between a base station and K terminals (K is a natural number greater than or equal to 1) and a transmit power limit value P of the base station, and inputting h and P into the input layer; and performing beamforming on signals to be transmitted to the K terminals using beamforming vectors derived using the output layer and at least one activation function, wherein the base station transmits the signals to the K terminals using M transmit antennas (M is a natural number greater than or equal to 1).

The output layer may include M×K nodes, the M×K nodes may be grouped into K node groups each composed of M nodes, and each node group may be configured in a direct beamforming learning (DBL) scheme of directly outputting a beamforming vector for each terminal.

The at least one activation function may include a function for limiting the beamforming vector for each terminal in order to satisfy the transmit power limit value P.

The output layer may include 2K nodes, the 2K nodes may be grouped into two node groups each composed of K nodes, and each node group may be configured in a feature learning (FL) scheme of outputting K predicted values included in an optimal beamforming solution.

The at least one activation function may include scaled softmax functions for satisfying the transmit power limit value P, which receive the 2K predicted variables output from the two node groups as inputs, and an output of a first scaled softmax function of the at least one activation function and an output of a second scaled softmax function that has undergone beam direction recovery may be combined to output a beamforming vector for each terminal.

The output layer may include K nodes, and the K nodes may be configured in a simplified feature learning (SFL) scheme of outputting K predicted values included in an optimal beamforming solution based on approximation according to uplink-downlink beamforming duality and diagonal dominance.

The at least one activation function may include scaled softmax functions for satisfying the transmit power limit value P, which receive the K predicted variables output from the K nodes as inputs, and an output of a first scaled softmax function of the at least one activation function and an output of a second scaled softmax function that has undergone beam direction recovery may be combined to output a beamforming vector for each terminal.

The beamforming method may further comprise performing an unsupervised training for the deep neural network, wherein the performing of the unsupervised training may comprise: inputting the channel information h and the transmit power limit value P to the input layer; and training parameters of the deep neural network to minimize a loss function defined by multiplying a sum data rate calculated according to input-output mapping of the deep neural network by (−1).

The beamforming method may further comprise performing a supervised training for the deep neural network, wherein the performing of the supervised training may comprise: inputting the channel information h and the transmit power limit value P to the input layer; and training parameters of the deep neural network to minimize a loss function defined as a difference between a sum data rate calculated according to optimal beamforming vectors corresponding to the channel information h and the transmit power limit value P and a sum data rate according to input-output mapping of the deep neural network.

According to a second exemplary embodiment of the present disclosure, a deep neural network may comprise an input layer, L hidden layers (L is a natural number greater than or equal to 1), and an output layer, a beamforming control apparatus may comprise a processor and a memory storing instructions executable by the processor, and when executed by the processor, the instructions may cause the processor to: obtain channel information h between a base station and K terminals (K is a natural number greater than or equal to 1) and a transmit power limit value P of the base station, and input h and P into the input layer; and perform beamforming on signals to be transmitted to the K terminals using beamforming vectors derived using the output layer and at least one activation function, wherein the base station transmits the signals to the K terminals using M transmit antennas (M is a natural number greater than or equal to 1).

The output layer may include M×K nodes, the M×K nodes may be grouped into K node groups each composed of M nodes, and each node group may be configured in a direct beamforming learning (DBL) scheme of directly outputting a beamforming vector for each terminal.

The output layer may include 2K nodes, the 2K nodes may be grouped into two node groups each composed of K nodes, and each node group may be configured in a feature learning (FL) scheme of outputting K predicted values included in an optimal beamforming solution.

The output layer may include K nodes, and the K nodes may be configured in a simplified feature learning (SFL) scheme of outputting K predicted values included in an optimal beamforming solution based on approximation according to uplink-downlink beamforming duality and diagonal dominance.

The instructions may further cause the processor to perform an unsupervised training for the deep neural network, wherein the performing of the unsupervised training comprises: inputting the channel information h and the transmit power limit value P to the input layer; and training parameters of the deep neural network to minimize a loss function defined by multiplying a sum data rate calculated according to input-output mapping of the deep neural network by (−1).

The instructions may further cause the processor to perform a supervised training for the deep neural network, wherein the performing of the supervised training comprises: inputting the channel information h and the transmit power limit value P to the input layer; and training parameters of the deep neural network to minimize a loss function defined as a difference between a sum data rate calculated according to optimal beamforming vectors corresponding to the channel information h and the transmit power limit value P and a sum data rate according to input-output mapping of the deep neural network.

According to a third exemplary embodiment of the present disclosure, a deep neural network may comprise an input layer, L hidden layers (L is a natural number greater than or equal to 1), and an output layer, a cloud radio access network (C-RAN) system may include a centralized processor (CP) and a plurality of remote radio heads (RRHs), the CP may be configured to: obtain channel information h between the plurality of RRHs and K terminals (K is a natural number greater than or equal to 1) and transmit power limit values P of the plurality of RRHs, input h and P into the input layer, derive beamforming vectors for signals to be transmitted to the K terminals by using the output layer and at least one activation function, and deliver the derived beamforming vectors to the plurality of RRHs, and the plurality of RRHs may be configured to: perform beamforming on the signals to be transmitted to the K terminals by using the beamforming vectors, and transmit the beamformed signals to the K terminals.

When the plurality of RRHs include M transmit antennas (M is a natural number greater than or equal to 1), the output layer may include M×K nodes, the M×K nodes may be grouped into K node groups each composed of M nodes, and each node group may be configured in a direct beamforming learning (DBL) scheme of directly outputting a beamforming vector for each terminal.

The output layer may include 2K nodes, the 2K nodes may be grouped into two node groups each composed of K nodes, and each node group may be configured in a feature learning (FL) scheme of outputting K predicted values included in an optimal beamforming solution.

The output layer may include K nodes, and the K nodes may be configured in a simplified feature learning (SFL) scheme of outputting K predicted values included in an optimal beamforming solution based on approximation according to uplink-downlink beamforming duality and diagonal dominance.

The deep neural network may be trained: in an unsupervised learning scheme in which parameters of the deep neural network are trained to minimize a loss function defined by multiplying a sum data rate calculated according to input-output mapping of the deep neural network by (−1); or in a supervised learning scheme in which the parameters of the deep neural network are trained to minimize a loss function defined as a difference between a sum data rate calculated according to optimal beamforming vectors corresponding to the channel information h and the transmit power limit values P and a sum data rate calculated according to the input-output mapping of the deep neural network.

Using exemplary embodiments of the present disclosure, beamforming vectors for simultaneously servicing multiple users can be derived in real time using a trained single deep neural network in a multi-user service wireless system including a massive MIMO system and a distributed MIMO system. In addition, a system performance such as a sum data rate for the users provided with services by using the derived beamforming vectors can be maximized. In particular, since the deep neural network is trained using channel information and various transmit power limit values of the base station as inputs, the trained single deep neural network can operate under various transmit power constraints.

BRIEF DESCRIPTION OF DRAWINGS

FIG. 12 is a table comparing an execution time of the deep learning neural network according to exemplary embodiments of the present disclosure and an execution time of the existing beamforming methods.

DETAILED DESCRIPTION OF THE EMBODIMENTS

Figure 1:
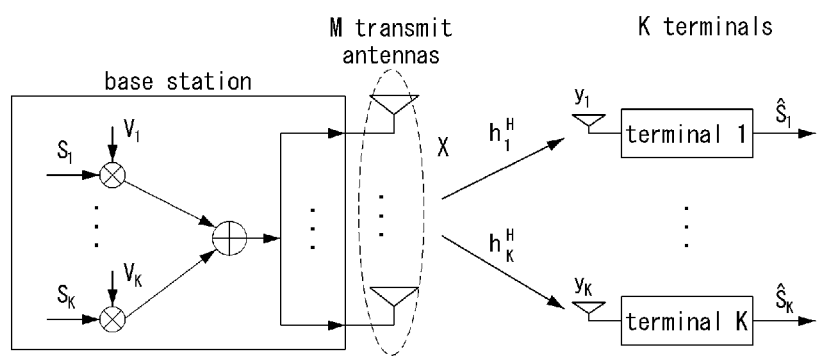
FIG. 1 is a conceptual diagram illustrating a multi-user beamforming system to which exemplary embodiments according to the present disclosure are applied.

Exemplary embodiments of the present disclosure are disclosed herein. However, specific structural and functional details disclosed herein are merely representative for purposes of describing embodiments of the present disclosure. Thus, embodiments of the present disclosure may be embodied in many alternate forms and should not be construed as limited to embodiments of the present disclosure set forth herein.

Accordingly, while the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present disclosure will be described in greater detail with reference to the accompanying drawings. In order to facilitate general understanding in describing the present disclosure, the same components in the drawings are denoted with the same reference signs, and repeated description thereof will be omitted.

In the following, a wireless communication network to which exemplary embodiments according to the present disclosure are applied will be described. The wireless communication network to which the exemplary embodiments according to the present disclosure are applied is not limited to the contents described below, and the exemplary embodiments according to the present disclosure may be applied to various wireless communication networks.

Throughout the specification, a network may be, for example, a wireless Internet such as wireless fidelity (WIFI), a mobile Internet such as wireless broadband internet (Wi-Bro) or world interoperability for microwave access (WiMax), a 2G mobile communication network such as global system for mobile communication (GSM) or code division multiple access (CDMA), a 3G mobile communication network such as wideband code division multiple access (WCDMA) or CDMA2000, a 3.5G mobile communication network such as high speed downlink packet access (HSDPA) or high speed uplink packet access (HSUPA), a 4G mobile communication network such as long term evolution (LTE) network or LTE-Advanced network, and a 5G mobile communication network.

Throughout the specification, a terminal may be a mobile station, a mobile terminal, a subscriber station, a portable subscriber station, a user equipment, an access terminal, or the like, and may include all or some functions of the terminal, mobile station, mobile terminal, subscriber station, portable subscriber station, user equipment, access terminal, or the like.

Here, the terminal may be a desktop computer, a laptop computer, a tablet PC, a wireless phone, a mobile phone, a smart phone, a smart watch, a smart glass, an e-book reader, a portable multimedia player (PMP), a portable game console, a navigation device, a digital camera, a digital multimedia broadcasting (DMB) player, a digital audio recorder, a digital audio player, a digital picture recorder, a digital picture player, a digital video recorder, a digital video player, or the like.

Throughout the specification, a base station may be an access point, a radio access station, a Node B, an evolved nodeB (eNB), a base transceiver station, a mobile multihop relay (MMR)-BS, or the like, and may include all or some functions of the base station, access point, radio access station, Node B, eNodeB, base transceiver station, MMR-BS, or the like.

In order to solve the problems of the prior arts, the present disclosure is directed to providing a method and an apparatus for training a deep neural network through a deep learning technique based on channel information obtained through actual measurement or simulation/emulation or generated based on a mathematical model, and their relevance on beamforming vectors affecting a system performance, and for calculating beamforming vectors in real time, which improve the performance of the wireless system, by using the trained deep neural network. In particular, exemplary embodiments of the present disclosure may provide an efficient beamforming method and a beamforming control apparatus that can minimize the number of deep learning parameters to be trained, and operate as a single deep neural network even under various power constraints of the radio system.

Exemplary embodiments of the present disclosure detailed below are applied to downlink transmission of a multi-user beamforming system. Therefore, in order to describe the exemplary embodiments of the present disclosure in detail, a multi-user beamforming system represented by FIG. 1 will be considered.

FIG. 1 is a conceptual diagram illustrating a multi-user beamforming system to which exemplary embodiments according to the present disclosure are applied.

As shown in FIG. 1, a multi-user beamforming system in which one base station equipped with M transmit antennas simultaneously provides services to K distributed terminals each of which is equipped with a single antenna is shown. In particular, FIG. 1 describes downlink transmission in the multi-user beamforming system. In addition, although FIG. 1 shows a configuration in which one base station equipped with M transmit antennas provides services to K terminals, exemplary embodiments of the present disclosure may also be applied to a cloud radio access network (C-RAN)-type distributed MIMO system in which distributed base stations and one central control apparatus for controlling their transmissions exist. This will be described later with reference to FIGS. 8 and 9.

The base station may precode a signal $s_k$ for a terminal k into a beamforming vector $v_k$ by using channel information $h_k$, $k \in \mathcal{K} \triangleq \{1, \ldots, K\}$ between the base station and the individual terminal k, and transmit a beamformed signal $x = \sum_{k \in \mathcal{K}} v_k s_k$ in which the precoded signals for K terminals are combined through the M transmit antennas. In this case, a signal $y_k$ received by the terminal k may be expressed as in Equation 1 below.

$$y_k = \underbrace{h_k^H v_k s_k}_{desired\ signal} + \underbrace{\sum_{l \in \mathcal{K} \setminus \{k\}} h_k^H v_l s_l}_{interference} + \underbrace{n_k}_{noise} \quad \text{[Equation 1]}$$

Here, $\mathcal{K}$ denotes a set of terminals that are subject to simultaneous transmission using the beamformed signal. In addition, the signal x beamformed and transmitted by the base station may have a transmit power constraint expressed by Equation 2 below. Here, P is a transmit power limit value of the base station.

$$\mathbb{E}[\|x\|^2] = \sum_{k \in \mathcal{K}} \|v_k\|^2 \leq P \quad \text{[Equation 2]}$$

The terminal k receiving the signal precoded with a given beamforming vector $v=[v_1^T \ldots v_K^T]^T$ may obtain a data rate calculated by Equation 3 below.

$$R_k \log_2(1 + SINR_k(v)) \quad \text{[Equation 3]}$$

Here, $SINR_k(v)$ may be expressed as in Equation 4 below.

$$SINR_k(v) = \frac{|h_k^H v_k|^2}{\sum_{l \in \mathcal{K} \setminus \{k\}} |h_k^H v_l|^2 + 1} \quad \text{[Equation 4]}$$

As can be seen from Equation 4, it can be seen that interference is controlled by the beamforming vector, and as a result, the data rate may also be determined. Accordingly, a problem P1 of deriving a beamforming vector that maximizes a sum rate of the terminals serviced by the base station may be established as in Equation 5 below.

$$P1: \underset{v}{\text{maximize}} \sum_{k \in \mathcal{K}} \log_2(1 + SINR_k(v)) \quad \text{[Equation 5]}$$
$$\text{s.t.} \sum_{k \in \mathcal{K}} \|v_k\|^2 \leq P$$

The above beamforming vector calculation is a non-convex optimization problem solving, and an iterative calculation procedure is required to derive an optimal solution. In this case, as the number of antennas, the number of densely deployed base stations, and the number of service target terminals increase, the computational complexity rapidly increases, and real-time derivation of the solution becomes impossible.

Deep Learning Neural Network Configuration

Figure 2:
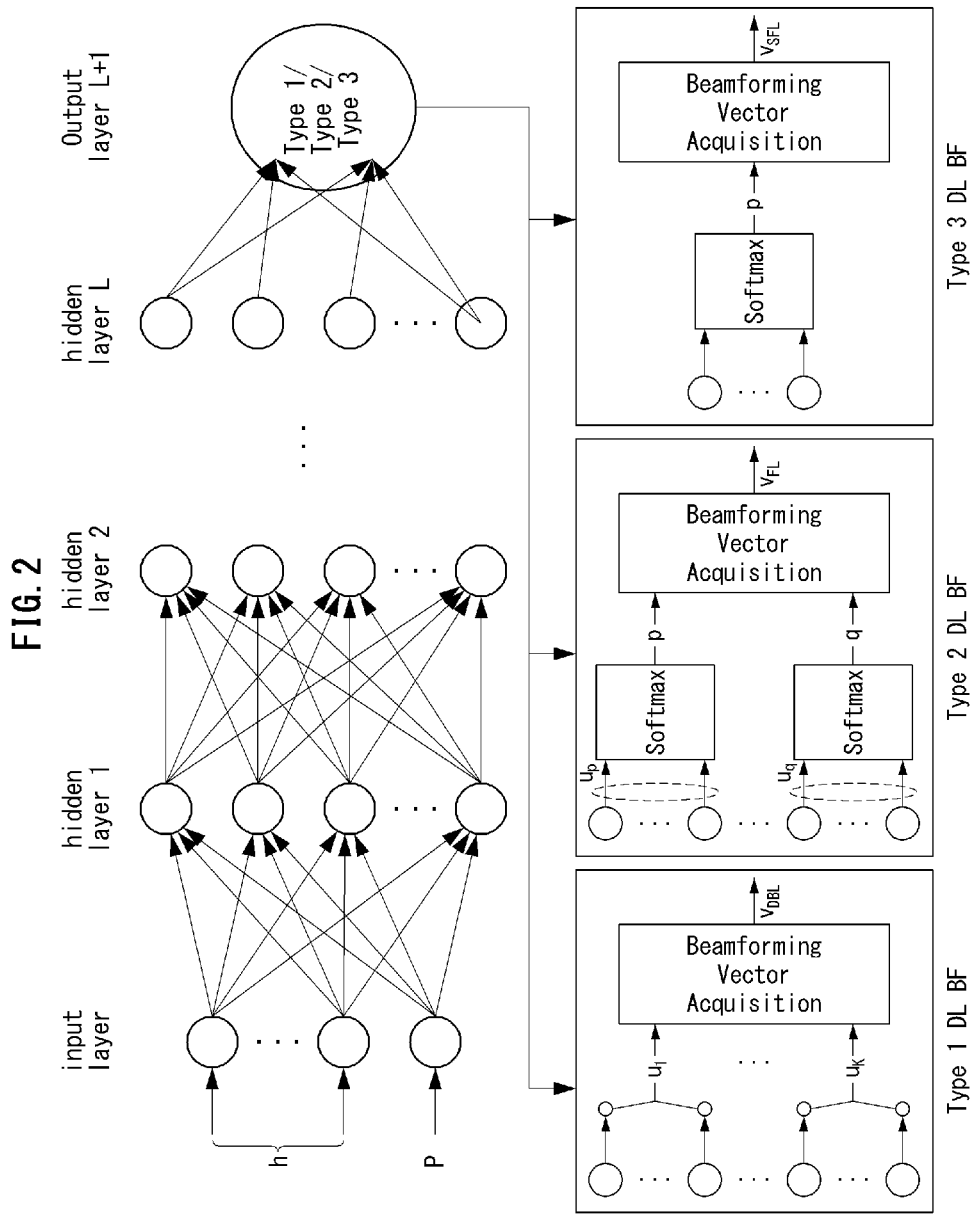
FIG. 2 is a conceptual diagram illustrating a deep learning neural network for beamforming according to exemplary embodiments of the present disclosure.

FIG. 2 is a conceptual diagram illustrating a deep learning neural network for beamforming according to exemplary embodiments of the present disclosure.

As shown in FIG. 2, a deep learning neural network according to an exemplary embodiment of the present disclosure may comprise one input layer, L hidden layers, and one output layer. In an exemplary embodiment, the deep learning neural network may be implemented as a fully-connected neural network (FNN) shown in FIG. 2. In another exemplary embodiment, the deep learning neural network may be implemented as a convolutional neural network (CNN).

Exemplary embodiments of the present disclosure propose three types of output layer implementation schemes. Hereinafter, for ease of notation, the output layer is expressed as an a layer L+1. Exemplary embodiments of the present disclosure for calculating beamforming vectors using the output of the deep learning neural network may use channel information $h=[h_1^T, \ldots, h_K^T]^T$, $h_k \in \mathbb{C}^{M \times 1}$ between the base station and the plurality of terminals (K terminals) and the transmit power limit value P as an input vector $x_0 \triangleq [h^T, P]^T \in \mathbb{C}^{MK+1}$ in order to capture input characteristics of the wireless system.

Accordingly, MK+1 input nodes may be configured (in case of deep learning libraries that do not support complex value calculation, two nodes (i.e., for a real part and an imaginary part) may be used for one complex number representation, and in this case the number of input nodes may be 2MK+1. Hereinafter, for convenience of explanation, it is assumed that complex number calculation is possible in one node). The number of nodes constituting the hidden layer l may be expressed as $N_l$. As the value of $N_l$ increases, more accurate learning may be possible, but as the value of $N_l$ increases, the learning complexity increases because the number of learning parameters increases. In addition, as the number L of hidden layers increases, accurate learning is possible, but the learning complexity increases. Accordingly, L and $N_l$ should be determined in consideration of the above-described trade-off.

The overall deep neural network forward-pass procedure from input to output may be expressed as $v = \mathcal{F}(x_0; \Theta)$. Here, $\Theta$ is a set of deep neural network parameters, and may be expressed as $\Theta = \{W_l \in \mathbb{C}^{N_l \times N_{l-1}}, b_l \in \mathbb{C}^{N_l}\}$, $l=1, \ldots, L+1$. $W_l$ is a weighted matrix of a layer l and $b_l$ is a bias vector of the layer l. The above $\mathcal{F}(x_0; \Theta)$ is embodied with calculations of successive neural layers, and the calculation of the layer l may be expressed as Equation 6 below.

$$x_l = f_l(W_l x_{l-1} + b_l) \quad \text{[Equation 6]}$$

Here, $f_l(\cdot)$ may be an activation function, and a rectified linear unit (ReLU) function may be used as an exemplary embodiment of $f_l(\cdot)$. In exemplary embodiments of the present disclosure, it is assumed that parameters related to the hidden layers are appropriately selected through a trial and error process. Meanwhile, in exemplary embodiments of the present disclosure, the input layer for capturing the input characteristics is defined as described above, and the output layer is also specifically defined because it is directly related to the solution of P1.

Referring to FIG. 2, three types of output layer schemes (direct beamforming learning (DBL), feature learning (FL), and simplified feature learning (SFL)) are shown.

Figure 3:
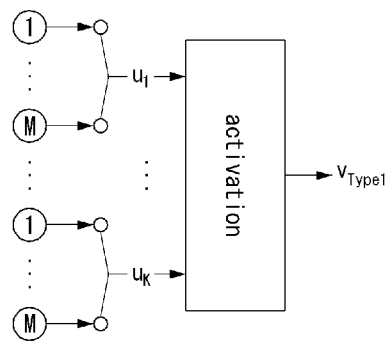
FIGS. 3 to 5 are conceptual diagrams illustrating various exemplary embodiments of the output layer applied to the deep learning neural network for beamforming according to exemplary embodiments of the present disclosure.
Figure 4:
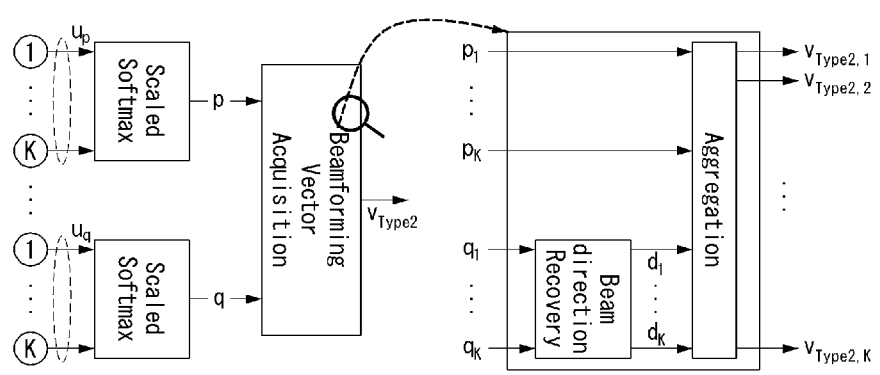
Figure 5:
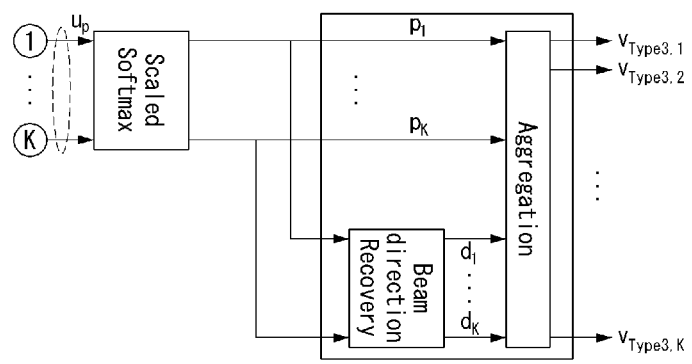

FIGS. 3 to 5 are conceptual diagrams illustrating various exemplary embodiments of the output layer applied to the deep learning neural network for beamforming according to exemplary embodiments of the present disclosure.

Direct Beamforming Learning (DBL)

Referring to FIG. 3, a configuration of the type 1 output layer of the deep learning neural network according to an exemplary embodiment of the present disclosure is shown. The type 1 output layer may be defined as an output layer for direct beamforming learning (DBL).

The layer L+1 corresponding to the type 1 output layer may be composed of a total of MK nodes, and as shown in FIG. 3, K node groups each of which is composed of M nodes may output beamforming vectors $(u_1, \ldots, u_K)$ for the terminals. $u=[u_1^T, \ldots, u_K^T]^T \in \mathbb{C}^{MK}$ may be calculated as in Equation 7 below.

$$u = W_{L+1} x_L + b_{L+1} \quad \text{[Equation 7]}$$

The information $u_1, \ldots, u_K$ of the output layer calculated as in Equation 7 may be input to an activation function. In order to satisfy the transmit power constraint of the base station, an activation function as shown in Equation 8 below may be used.

$$v_{Type1,k} = \sqrt{\frac{P}{\sum_{j \in \mathcal{K}} \|u_j\|^2}} u_k, \quad k=1, \ldots, K \quad \text{[Equation 8]}$$

Thus, the output vector of the activation function may be $v_{Type1}=[v_{Type1,1}^T, \ldots, v_{Type1,K}^T]^T$. In case of the type 1 deep learning beamforming using the type 1 output layer, since the beamforming vectors are directly derived from the output information u of the output layer, the calculation complexity of the output layer information may be simple. However, since the number of predicted values constituting u is as large as a product of M and K, a sufficiently deep deep neural network and a sufficiently large number of training samples are required. Also, an overfitting problem may occur.

Feature Learning (FL)

Unlike the type 1 output layer that directly outputs beamforming vectors, a scheme of reducing the number of predicted values needed for deriving a beamforming solution by generating lower-dimensional intermediate variables that can act as key features related to an optimal beamforming solution may be required. For this, a structure of the optimal beamforming solution, which is expert knowledge of the communication domain, may be utilized. It is known that the structure of the optimal beamforming solution in the wireless communication field has a form of Equation 9 below.

$$v_{opt,k} = \sqrt{p_k} \frac{\left(I_M + \sum_{j \in \mathcal{K}} q_j h_j h_j^H\right)^{-1} h_k}{\left\|\left(I_M + \sum_{j \in \mathcal{K}} q_j h_j h_j^H\right)^{-1} h_k\right\|} \triangleq \sqrt{p_k} d_k \quad \text{[Equation 9]}$$

The variables constituting the structure of the optimal beamforming solution comprise input variables h and variables $(p_k, q_k)$, $k=1, \ldots, K$ to be predicted. Accordingly, a scheme of outputting K $(p_k, q_k)$ information pairs through the output layer and recovering beamforming vectors based on $(p_k, q_k)$ pairs output from the output layer may be considered.

Referring to FIG. 4, a configuration of the type 2 output layer of the deep learning neural network according to an exemplary embodiment of the present disclosure is shown. The type 2 output layer may be defined as an output layer for feature learning (FL).

The layer L+1 corresponding to the type 2 output layer may be composed of a total of 2K nodes, and may be grouped into two groups each of which is composed of K nodes. The two groups may output $u_p=[u_{p,1}, \ldots, u_{p,K}]$ and $u_q=[u_{q,1}, \ldots, u_{q,K}]$, respectively. $u_p$ and $u_q$ may be input to an activation function (hereinafter, referred to as a 'scaled softmax' function) defined as in Equation 10 below.

$$f(z_k) = \frac{P \exp(z_k)}{\sum_{k \in \mathcal{K}} \exp(z_k)}, \quad k=1, \ldots, K \quad \text{[Equation 10]}$$

Here, $z_k$ is $u_{p,k}$ or $u_{q,k}$. The function value $f(z_k)$ is $p_k$ or $q_k$. The activation function defined as in Equation 10 is a scaled softmax function having a $\sum_{k \in \mathcal{K}}$ form obtained by multiplying an existing softmax function by P to satisfy $\sum_{k \in \mathcal{K}} p_k = P$. In the case of $q_k$, $\sum_{k \in \mathcal{K}} q_k = P$ does not need to be satisfied, but the same scaled $\sum_{k \in \mathcal{K}}$ softmax function may be used. The output information of the two scaled softmax functions may the predicted values $(p_k, q_k)$, $k=1, \ldots, K$ of the optimal beamforming structure presented in Equation 9, and $q_k$, $k=1, \ldots, K$ may be transformed to beam direction information $d_k$, $k=1, \ldots, K$ defined in Equation 9 (i.e., beam direction recovery). In this case, the beam direction recovery may be performed through inverse matrix calculation of the matrix according to a transformation equation as shown in Equation 11 below.

$$d_k = \frac{\left(I_M + \sum_{j \in \mathcal{K}} q_j h_j h_j^H\right)^{-1} h_k}{\left\|\left(I_M + \sum_{j \in \mathcal{K}} q_j h_j h_j^H\right)^{-1} h_k\right\|} \quad \text{[Equation 11]}$$

$d_k$, $k=1, \ldots, K$ derived through the beam direction recovery may be finally combined with $p_k$, $k=1, \ldots, K$, and a beamforming vector $v_{Type2}=[v_{Type2,1}^T, \ldots, v_{Type2,K}^T]^T$ may be output.

Simplified Feature Learning (SFL)

A scheme of further reducing the number of variables to be predicted in the output layer by using additional domain knowledge may be considered. The further utilized communication domain knowledge may be uplink-downlink beamforming duality and diagonal dominance. According to the uplink-downlink beamforming duality, an optimal solution structure of downlink transmission beamforming and uplink reception beamforming of the base station are the same as Equation 9, and in Equation 9, if q, is set to be equal to a uplink transmit power of the terminal k, $v_{opt,k}$ may become an uplink reception beamforming vector of the terminal k. In a beamforming vector derivation problem that provides a minimum sum power satisfying a condition $SINR_k(v) \geq \gamma_k$, $\forall_k$, which is similar to the P1 optimization problem but more easily solvable, the structure of the optimal solution also follows Equation 9, and in this case, optimal power vectors may be given by Equations 12 and 13 for downlink and uplink, respectively.

$$p^{opt} = \sigma^2 \Omega^{-1} 1_K \qquad \text{[Equation 12]}$$

$$q^{opt} = \sigma^2 (\Omega^T)^{-1} 1_K \qquad \text{[Equation 13]}$$

Here, the matrix $\Omega \in \mathbb{R}^{K \times K}$ is composed of elements $[\Omega]_{kj}$ of the k-th row and j-th column, and $[\Omega]_{kj}$ may be expressed as Equation 14 below.

$$[\Omega]_{kj} = \begin{cases} -\dfrac{1}{\gamma_k} |h_k^H d_k|^2, & k = j \\ |h_k^H d_j|^2, & k \neq j \end{cases} \qquad \text{[수학식 14]}$$

As can be seen from Equations 12 and 13, if $\Omega \approx \Omega^T$, then $p^{opt} \approx q^{opt}$. In this case, Equation 9 may be expressed as Equation 15 below.

$$v_k = \sqrt{p_k} \frac{\left(I_M + \sum_{j \in \mathcal{K}} p_j h_j h_j^H\right)^{-1} h_k}{\left\|\left(I_M + \sum_{j \in \mathcal{K}} p_j h_j h_j^H\right)^{-1} h_k\right\|} \qquad \text{[Equation 15]}$$

Therefore, through the approximation (i.e., $q_j \approx p_j$, $j \approx \kappa$), the number of variables to be predicted may be reduced to K, which is half of that in the case of type 2. The inference that performance degradation by such the approximation may be very limited is based on the fact that, in general, the performance of the zero forcing (ZF) beamforming scheme approximates the optimal beamforming performance at a high SNR operating point and interference between terminals is relatively reduced at a high SNR. Further, such the understanding may lead to an interpretation that the diagonal components of the matrix n are superior to other components, and a condition such as $\Omega \approx \Omega^T$ may be assumed. In fact, the matrix n may be calculated through the solution of the P1 problem, and $\Omega \approx \Omega^T$ can be satisfied because the diagonal components of the calculated n are superior to other components.

In FIG. 5, a configuration of the type 3 output layer of the deep learning neural network according to an exemplary embodiment of the present disclosure is shown. The type 3 output layer may be defined as an output layer for the simplified feature learning (SFL) scheme.

As described above, the type 3 output layer may reduce the number of variables to be predicted as compared to the type 2 output layer based on the uplink-downlink beamforming duality and diagonal dominance.

When compared with the type 2 output layer shown in FIG. 4, output nodes and computation blocks associated with $u_q$ do not exist in the type 3 output layer. Accordingly, the type 3 output layer may be composed of K nodes. Instead of $q_k$, k=1, ..., K, $p_k$, k=1, ..., K may be used according to the above approximation (i.e., $q_j \approx p_j$, $j \in \kappa$) for the beam direction recovery.

Deep Neural Network Training

Hereinafter, a beamforming method using an unsupervised learning scheme and a supervised learning scheme as a learning scheme for training a deep learning neural network according to an exemplary embodiment of the present disclosure will be described.

Figure 6:
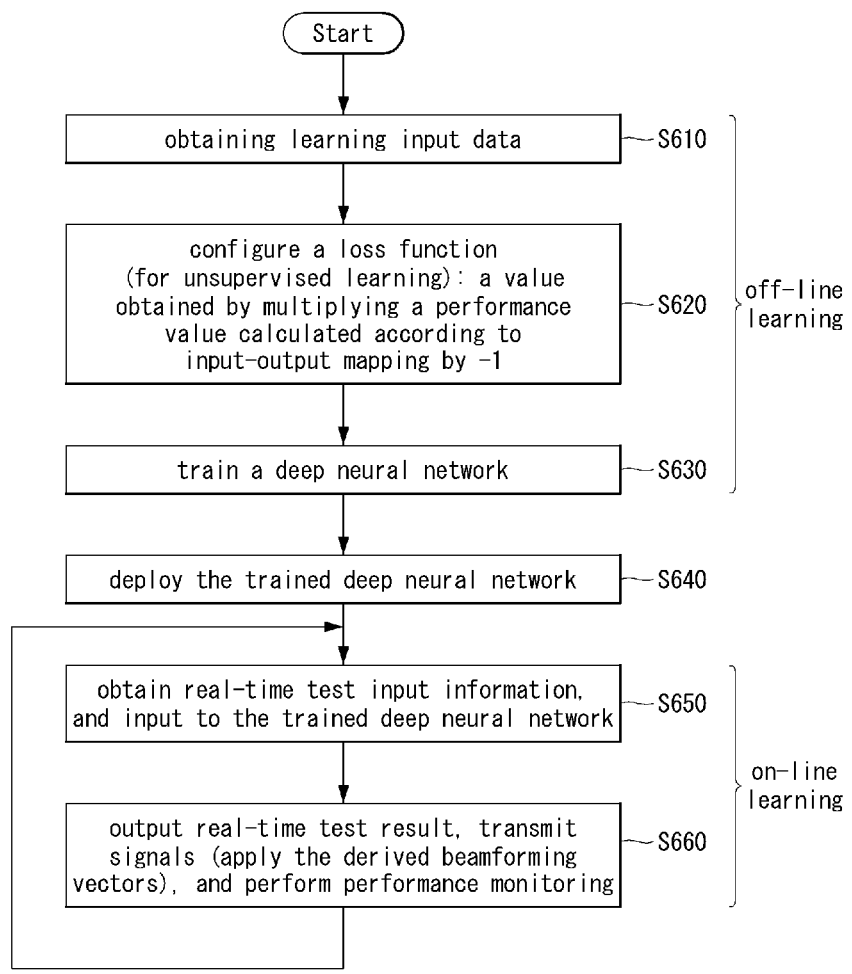
FIG. 6 is a flowchart illustrating a beamforming method based on unsupervised deep learning according to an exemplary embodiment of the present disclosure.

FIG. 6 is a flowchart illustrating a beamforming method based on unsupervised deep learning according to an exemplary embodiment of the present disclosure.

In the beamforming method described with reference to FIG. 6, any type of deep neural networks such as FNN, CNN, and RNN may be used as the deep neural network used for deep learning. However, the input and output described below follow the structure described with reference to the FNN described with reference to FIG. 2. In particular, the output structure follows one of the three output structures proposed through FIG. 3, 4, or 5.

Referring to FIG. 6, the beamforming method according to an exemplary embodiment of the present disclosure may comprise steps S610 to S630 of performing off-line learning based on unsupervised learning, a step S640 of deploying the trained deep neural network in a system, and steps S650 to S660 of performing on-line learning while performing beamforming using the deep neural network.

The off-line learning procedure according to an exemplary embodiment according to the present disclosure starts from the step of S610 of obtaining learning input data. In this case, the learning input data may include channel information between the base station and multiple users and a transmit power limit value of the base station. The learning input data may be obtained through simulation based on mathematical modeling, or may be obtained by system emulation through construction of a test bed or the like. Alternatively, information measured in the actual system may be used as the learning input data.

As described in FIG. 2, the deep neural network composed of the input layer, hidden layers, and output layer may be formed, and an objective function of the deep neural network may be a sum data rate performance according to input-output mapping $v = \mathcal{F}_S(x_0; \Theta_S)$ (here, $S \in \{Type1, Type2, Type3\}$) of the deep neural network. Therefore, optimized parameters to be determined in the deep neural network may be determined through Equation 16 below.

$$\max_{\Theta_S} \mathbb{E}_{h,P}\left[\sum_{k \in \mathcal{K}} \log_2(1 + SINR_k(\mathcal{F}_S(x_0; \Theta_S)))\right] \qquad \text{[Equation 16]}$$

The solution of Equation 16 may be set as a loss function $f(\Theta_S)$ defined as Equation 17 below (S620). That is, the loss function may be a value obtained by multiplying a sum data rate calculated according to the input-output mapping of the deep learning neural network by −1.

$$f(\Theta_S) = -1 \times \mathbb{E}_{h,P}\left[\sum_{k \in \mathcal{K}} \log_2(1 + SINR_k((\mathcal{F}_S(x_0; \Theta_S)))\right] \qquad \text{[Equation 17]}$$

The learning of the deep neural network parameters that minimize the loss function may be derived by iteratively updating the deep neural network parameters in a direction in which a differential value $\nabla_{\Theta_S} f(\Theta_S)$ decreases (S630). As an example of a specific algorithm for this purpose, the "mini-batch stochastic gradient descent" published by Adam et al. may be used, and the deep neural network parameter $\Theta_S^{[n]}$ in the n-th iteration may be updated as in Equation 18 below.

$$\Theta_S^{[n]} = \Theta_S^{[n-1]} + \eta \, \mathbb{E}_B\left[\sum_{k \in \mathcal{K}} \nabla_{\Theta_S} \log_2(1 + SINR_k(\mathcal{F}_S(x_0; \Theta_S^{[n-1]})))\right] \qquad \text{[Equation 18]}$$

Here, $\eta > 0$ is a learning rate, and $\mathcal{B}$ is a set of input (h, P) samples of the $\mathcal{B}$ deep neural network corresponding to a mini-batch size.

When the unsupervised learning is completed, the trained deep neural network may be included in a beamforming control apparatus of the base station, and deployed in a target wireless system (S640).

Thereafter, the beamforming control apparatus may input actually-measured channel information and transmit power limit value to the trained deep neural network (S650), derive beamforming vectors in real time through simple linear matrix product operations in the deep neural network, and transmit signals by performing beamforming on the signals based on the derived beamforming vectors (S660).

In this case, performance monitoring for signal transmission by the beamforming vectors output in response to the actually-measured channel information and transmit power constraint of the base station may be continuously performed, and the result of the performance monitoring may be fed back to perform online learning (S650-S660).

In the case of such the unsupervised learning of the deep neural network, since prior knowledge of output values according to input information is not required, additional online learning may also be easily performed in the process of being deployed and tested in the system.

Figure 7:
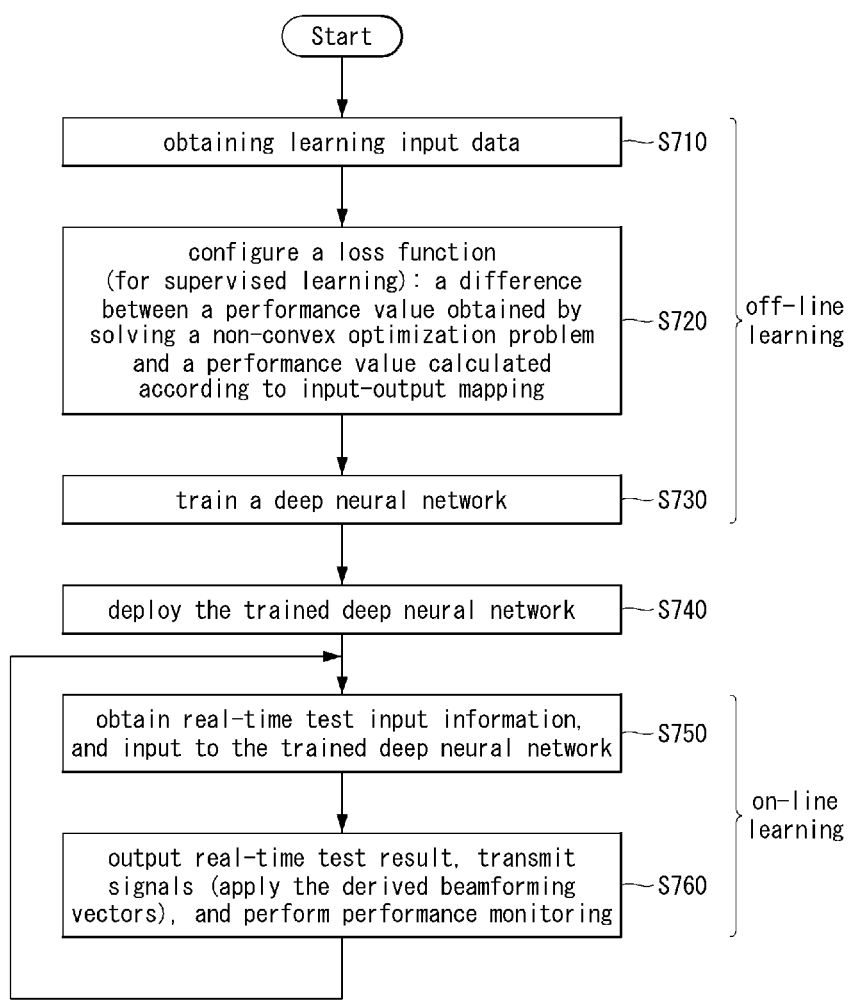
FIG. 7 is a flowchart illustrating a beamforming method based on supervised deep learning according to an exemplary embodiment of the present disclosure.

FIG. 7 is a flowchart illustrating a beamforming method based on supervised deep learning according to an exemplary embodiment of the present disclosure.

The difference between the supervised learning described with reference to FIG. 7 and the unsupervised learning described with reference to FIG. 6 is in configuration of a loss function for training the deep neural network. In the supervised learning, input information (i.e., channel information h and transmit power limit value P) and corresponding correct output values (i.e., optimal beamforming vectors) should be secured as prior information as learning input data (S710). An error (difference) between a performance value calculated for the output values obtained using the prior information and a performance value calculated according to the input-output mapping of the deep neural network is defined as a loss (S720). Therefore, for the supervised learning, it is necessary to solve the non-convex optimization P1 problem through iterative convex approximation to secure input-output mapping information. The step S730 of training the parameters of the deep neural network that minimizes the loss function may be performed by training the deep neural network parameters that minimize the error between the performance value calculated for the output values obtained using the prior information and the performance value calculated according to the input-output mapping of the deep neural network.

A step S740 of deploying the trained deep neural network, a step S750 of obtaining real-time test input information and inputting it to the trained deep neural network, and a step S760 of outputting the real-time test results and calculating beamforming vectors to transmit beamformed signals may be performed in the manner identical or similar to the steps S640 to S660 described with reference to FIG. 6.

Application to Cloud Radio Access Network

The exemplary embodiments of the present disclosure may be applied to beamforming in a cloud radio access network (C-RAN) as well as beamforming in the single base station described in FIG. 1.

Figure 8:
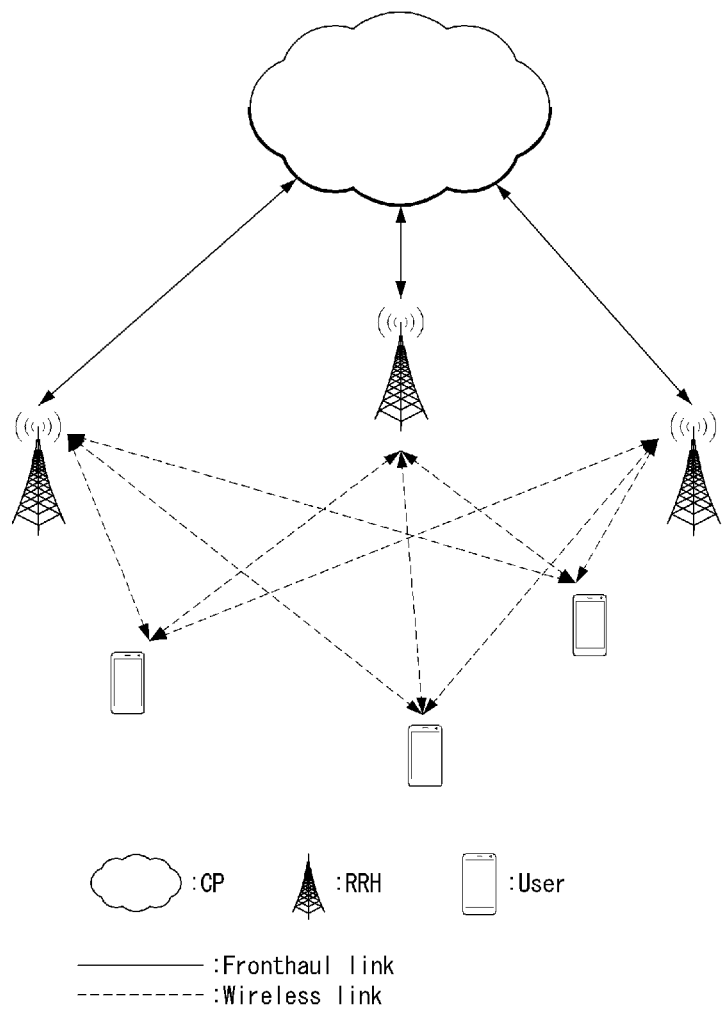
FIG. 8 is a conceptual diagram illustrating a structure of a cloud radio access network to which exemplary embodiments of the present disclosure are applied.

FIG. 8 is a conceptual diagram illustrating a structure of a cloud radio access network to which exemplary embodiments of the present disclosure are applied.

In the C-RAN architecture, a baseband processing that is traditionally performed locally in an individual base station (BS) is aggregated into one cloud processing center (hereafter, a centralized processor (CP)) and processed in a centralized manner. In the C-RAN architecture, the BS has only RF and antenna functions, so it is called a 'Remote Radio Head (RRH)'. The RRH and the cloud processing center are connected by a fronthaul link.

Recently, in order to reduce a required fronthaul link capacity, a baseband functional split in which a part of the baseband functions located in the CP are located in the RRHs is also being considered. In case of such the C-RAN system, interference between users may be controlled by the CP through cooperation of RRHs distributed, that is, through cooperative beamforming. After all, the problem of maximizing a sum data rate of user data provided by the C-RAN system is the P1 problem. However, the capacity of the fronthaul link connecting the CP and the RRHs may be limited as described above, and the limited capacity may vary. Also, transmit power limit values of the distributed RRHs may be different from each other. Therefore, as described above, a beamforming control apparatus applied to the cloud RAN system that may include heterogeneous fronthaul and RRHs needs to be expanded based on the deep neural network of the present disclosure described with reference to FIGS. 2 to 7.

Figure 9:
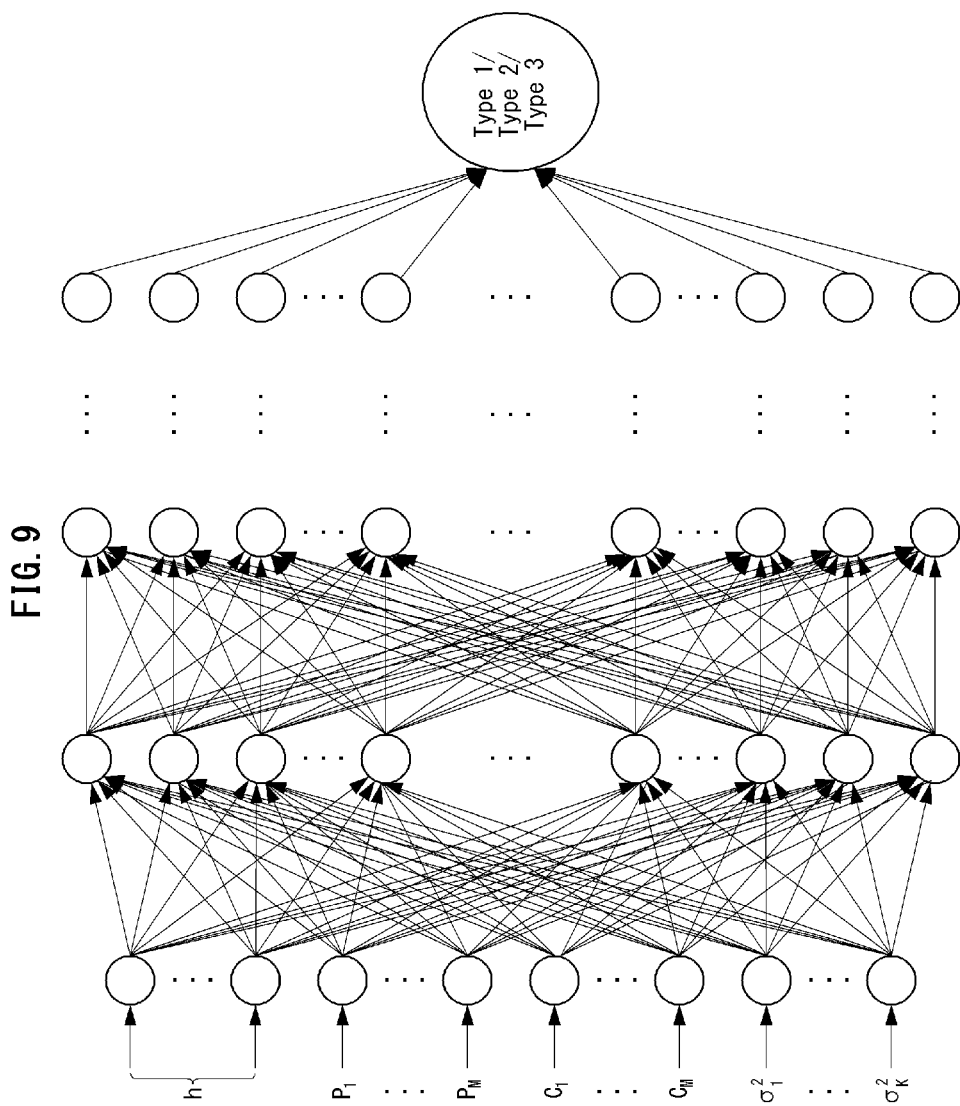
FIG. 9 is a conceptual diagram for describing a specific example of applying exemplary embodiments of the present disclosure to a cloud radio access network.

FIG. 9 is a conceptual diagram for describing a specific example of applying exemplary embodiments of the present disclosure to a cloud radio access network.

Unlike the simplified transmission system shown in FIG. 1, when the exemplary embodiments of the present disclosure are applied to a C-RAN, further more information may be input to the input layer in order to capture the input characteristics of the C-RAN system described above. The channel information h may be used identically, but different transmit power limit values $P_1, \ldots, P_M$ of M distributed RRHs may be input. In addition, capacity constraint values $C_1, \ldots, C_M$ of the fronthaul links for connecting individual RRHs to the CP may be additionally input to the input layer. As additional information, $\sigma_1^2, \ldots, \sigma_K^2$ may be used as interference and noise information measured by individual user terminals.

In order to sufficiently learn such the additional input features, the number of hidden layers of the deep neural network shown in FIG. 2 needs to be increased, and the number of nodes forming one hidden layer also needs to be increased.

Figure 10:
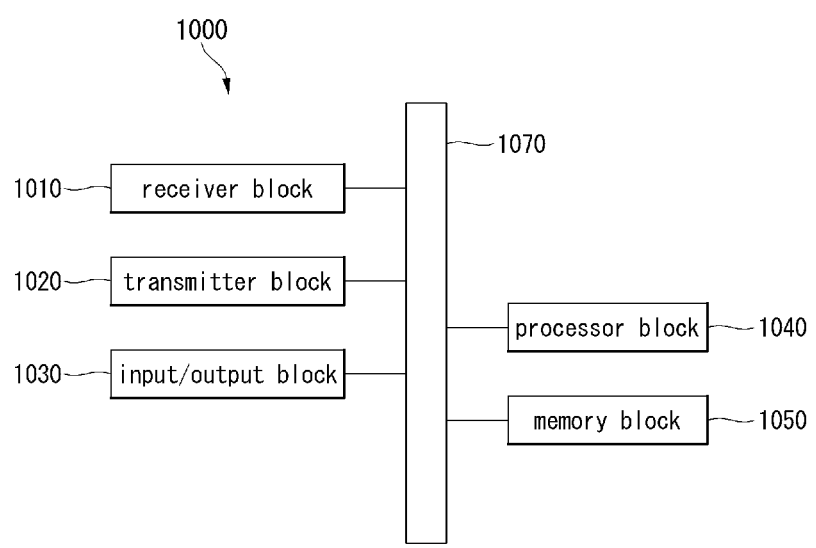
FIG. 10 is a block diagram for describing a beamforming control apparatus to which the deep learning-based beamforming method according to exemplary embodiments of the present disclosure is applied.

FIG. 10 is a block diagram for describing a beamforming control apparatus to which the deep learning-based beamforming method according to exemplary embodiments of the present disclosure is applied.

Referring to FIG. 10, a beamforming control apparatus 100 for performing the deep learning-based beamforming method according to the exemplary embodiments of the present disclosure may comprise a receiver block 1010, a transmitter block 1020, an input/output (I/O) block 1030, a processor block 1040, a memory block 1050, and a data bus 1070 interconnecting the blocks.

The receiver block 1010 may be a block including hardware and software necessary for receiving control and data signals from other network devices (e.g., RRH) or blocks. The transmitter block 1020 may be a block including hardware and software necessary for transmitting control and data signals to other network devices or blocks. The input/output block 1030 may be a block including hardware and software used to exchange signals other than signals transmitted/received through the receiver block 1010 and the transmitter block 1020.

The memory block 1050 may be a block capable of storing data in various ways. The processor block 1040 may be a block capable of processing data. For example, the processor block 1040 may include a processor structurally configured to perform specific operations, or a processor structurally configured to execute instructions included in computer-readable code. The above processors may include a microprocessor, a signal processing processor, a system-on-chip processor, a central processing unit processor, an ASIC, an FPGA, and the like.

Performance Analysis Results

Hereinafter, effects according to the above-described exemplary embodiments of the present disclosure will be described through performance analysis results.

Figure 11:
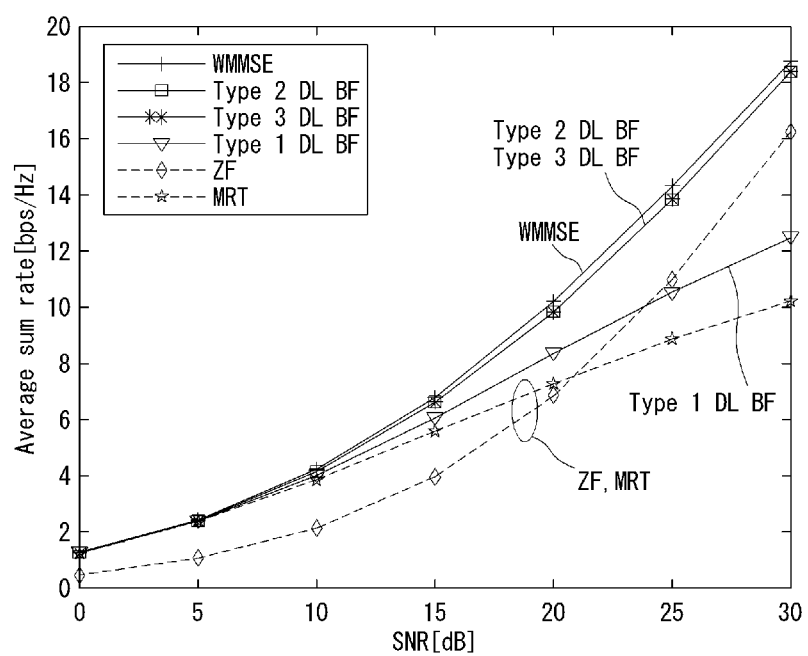
FIG. 11 is a graph comparing sum data rates when the deep learning neural network according to exemplary embodiments of the present disclosure is applied and sum data rates when the existing beamforming methods are applied.

FIG. 11 is a graph comparing sum data rates when the deep learning neural network according to exemplary embodiments of the present disclosure is applied and sum data rates when the existing beamforming methods are applied.

Referring to FIG. 11, under a condition of 4×4 (M=4, K=4), sum data rates that can be provided by the deep learning-based beamforming control apparatus to which the three types of output layers according to the exemplary embodiments of the present disclosure are applied are compared with sum data rates of WMMSE, ZF, and MRT schemes, which are the existing beamforming schemes.

The weighted minimum mean square error (WMMSE) scheme provides optimal performance by solving the non-convex optimization problem presented by P1 through iterative calculations, but a time required for the scheme increases as M and K increase and an SNR increases. Thus, the WMMSE is a scheme that cannot be applied in real time. The zero-forcing (ZF) and maximum ratio transmission (MRT) schemes are linear beamforming schemes based on channel information, and can be applied in real time, but their performances are limited as shown in FIG. 11. For reference, the ZF and MRT performances shown in FIG. 11 are configured with optimal power values to increase the sum data rates, and thus, when the optimal power control is not performed, the performances degraded than the performances shown in FIG. 11 may be provided.

In case of the deep learning-based beamforming control apparatus according to the exemplary embodiments of the present disclosure, the DBL scheme of type 1 is superior to the ZF and MRT schemes except for a high SNR range, but as the SNR increases, degraded performance rather than the optimal performance may be provided. On the other hand, it can be seen that the FL scheme of type 2 and the SFL scheme of type 3 may provide the same performance, and may provide performance similar to the optimal method in the entire operating SNR range.

FIG. 12 is a table comparing an execution time of the deep learning neural network according to exemplary embodiments of the present disclosure and an execution time of the existing beamforming methods.

The table shown in FIG. 12 shows results of comparing the execution times of three types of deep learning-based beamforming control apparatuses according to the exemplary embodiments of the present disclosure with the execution time of the WMMSE, which is the optimal scheme as shown in FIG. 11. The table shown in FIG. 12 shows measurement results under the conditions of (M=K=4) and (M=K=6). The system used for the measurement system uses Intel i7-7700K CPU, 64 GB of RAM, and a Titan XP GPU. From the presented results, it can be seen that the execution time of the proposed deep learning-based beamforming control apparatus is significantly shorter than the WMMSE execution time.

In addition, looking at the execution times of the three proposed types, the type 1 scheme has the longest execution time, and although there is no significant difference between the type 2 scheme and the type 3 scheme, the type 2 scheme has a slightly longer execution time. In addition, the WMMSE takes more time to converge as P increases, but the execution times of the proposed schemes are independent of P. In FIG. 12, the execution time results when the proposed schemes are implemented with a fully-connected neural network (FNN) and a convolutional neural network (CNN) are also presented. It can be seen that a case of being implemented with FNN has shorter execution time than a case of being implemented with CNN.

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

What is claimed is:

1. A beamforming method using a deep neural network, the deep neural network comprising an input layer, L hidden layers (L is a natural number greater than or equal to 1), and an output layer, and the beamforming method comprising:

obtaining channel information h between a base station and K terminals (K is a natural number greater than or equal to 1) and a transmit power limit value P of the base station, and inputting h and P into the input layer; and performing beamforming on signals to be transmitted to the K terminals using beamforming vectors derived using the output layer and at least one activation function, wherein the base station transmits the signals to the K terminals using M transmit antennas (M is a natural number greater than or equal to 1), and wherein the deep neural network is trained:

in an unsupervised learning scheme in which parameters of the deep neural network are trained to minimize a loss function defined by multiplying a sum data rate calculated according to input-output mapping of the deep neural network by (−1); or in a supervised learning scheme in which the parameters of the deep neural network are trained to minimize a loss function defined as a difference between a sum data rate calculated according to optimal beamforming vectors corresponding to the channel information h and the transmit power limit values P and a sum data rate calculated according to the input-output mapping of the deep neural network.

2. The beamforming method according to claim 1, wherein the output layer includes M×K nodes, the M×K nodes are grouped into K node groups each composed of M nodes, and each node group is configured in a direct beamforming learning (DBL) scheme of directly outputting a beamforming vector for each terminal.

3. The beamforming method according to claim 2, wherein the at least one activation function includes a function for limiting the beamforming vector for each terminal in order to satisfy the transmit power limit value P.

4. The beamforming method according to claim 1, wherein the output layer includes 2K nodes, the 2K nodes are grouped into two node groups each composed of K nodes, and each node group is configured in a feature learning (FL) scheme of outputting K predicted values included in an optimal beamforming solution.

5. The beamforming method according to claim 4, wherein the at least one activation function includes scaled softmax functions for satisfying the transmit power limit value P, which receive the 2K predicted variables output from the two node groups as inputs, and an output of a first scaled softmax function of the at least one activation function and an output of a second scaled softmax function that has undergone beam direction recovery are combined to output a beamforming vector for each terminal.

6. The beamforming method according to claim 1, wherein the output layer includes K nodes, and the K nodes are configured in a simplified feature learning (SFL) scheme of outputting K predicted values included in an optimal beamforming solution based on approximation according to uplink-downlink beamforming duality and diagonal dominance.

7. The beamforming method according to claim 6, wherein the at least one activation function includes scaled softmax functions for satisfying the transmit power limit value P, which receive the K predicted variables output from the K nodes as inputs, and an output of a first scaled softmax function of the at least one activation function and an output of a second scaled softmax function that has undergone beam direction recovery are combined to output a beamforming vector for each terminal.

8. A beamforming control apparatus using a deep neural network, the deep neural network comprising an input layer, L hidden layers (L is a natural number greater than or equal to 1), and an output layer, and the beamforming control apparatus comprising a processor and a memory storing instructions executable by the processor, wherein when executed by the processor, the instructions cause the processor to:
obtain channel information h between a base station and K terminals (K is a natural number greater than or equal to 1) and a transmit power limit value P of the base station, and input h and P into the input layer; and
perform beamforming on signals to be transmitted to the K terminals using beamforming vectors derived using the output layer and at least one activation function,
wherein the base station transmits the signals to the K terminals using M transmit antennas (M is a natural number greater than or equal to 1), and
wherein the deep neural network is trained:
in an unsupervised learning scheme in which parameters of the deep neural network are trained to minimize a loss function defined by multiplying a sum data rate calculated according to input-output mapping of the deep neural network by (−1); or
in a supervised learning scheme in which the parameters of the deep neural network are trained to minimize a loss function defined as a difference between a sum data rate calculated according to optimal beamforming vectors corresponding to the channel information h and the transmit power limit values P and a sum data rate calculated according to the input-output mapping of the deep neural network.

9. The beamforming control apparatus according to claim 8, wherein the output layer includes M×K nodes, the M×K nodes are grouped into K node groups each composed of M nodes, and each node group is configured in a direct beamforming learning (DBL) scheme of directly outputting a beamforming vector for each terminal.

10. The beamforming control apparatus according to claim 8, wherein the output layer includes 2K nodes, the 2K nodes are grouped into two node groups each composed of K nodes, and each node group is configured in a feature learning (FL) scheme of outputting K predicted values included in an optimal beamforming solution.

11. The beamforming control apparatus according to claim 8, wherein the output layer includes K nodes, and the K nodes are configured in a simplified feature learning (SFL) scheme of outputting K predicted values included in an optimal beamforming solution based on approximation according to uplink-downlink beamforming duality and diagonal dominance.

12. A cloud radio access network (C-RAN) system including a centralized processor (CP) and a plurality of remote radio heads (RRHs), the CP including a deep neural network comprising a an input layer, L hidden layers (L is a natural number greater than or equal to 1), and an output layer,
wherein the CP is configured to: obtain channel information h between the plurality of RRHs and K terminals (K is a natural number greater than or equal to 1) and transmit power limit values P of the plurality of RRHs, input h and P into the input layer, derive beamforming vectors for signals to be transmitted to the K terminals by using the output layer and at least one activation function, and deliver the derived beamforming vectors to the plurality of RRHs,
wherein the plurality of RRHs are configured to: perform beamforming on the signals to be transmitted to the K terminals by using the beamforming vectors, and transmit the beamformed signals to the K terminals, and
wherein the deep neural network is trained:
in an unsupervised learning scheme in which parameters of the deep neural network are trained to minimize a loss function defined by multiplying a sum data rate calculated according to input-output mapping of the deep neural network by (−1); or
in a supervised learning scheme in which the parameters of the deep neural network are trained to minimize a loss function defined as a difference between a sum data rate calculated according to optimal beamforming vectors corresponding to the channel information h and the transmit power limit values P and a sum data rate calculated according to the input-output mapping of the deep neural network.

13. The C-RAN system according to claim 12, wherein when the plurality of RRHs include M transmit antennas (M is a natural number greater than or equal to 1), the output layer includes M×K nodes, the M×K nodes are grouped into K node groups each composed of M nodes, and each node group is configured in a direct beamforming learning (DBL) scheme of directly outputting a beamforming vector for each terminal.

14. The C-RAN system according to claim 12, wherein the output layer includes 2K nodes, the 2K nodes are grouped into two node groups each composed of K nodes, and each node group is configured in a feature learning (FL) scheme of outputting K predicted values included in an optimal beamforming solution.

15. The C-RAN system according to claim 12, wherein the output layer includes K nodes, and the K nodes are configured in a simplified feature learning (SFL) scheme of outputting K predicted values included in an optimal beamforming solution based on approximation according to uplink-downlink beamforming duality and diagonal dominance.

* * * * *